(12) United States Patent
Pinkal

(10) Patent No.: US 8,231,097 B2
(45) Date of Patent: Jul. 31, 2012

(54) AIRCRAFT EQUIPMENT SUPPORT

(75) Inventor: Donald R. Pinkal, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 300 days.

(21) Appl. No.: 12/557,745

(22) Filed: Sep. 11, 2009

(65) Prior Publication Data

US 2011/0062286 A1 Mar. 17, 2011

(51) Int. Cl.
 *B60P 7/08* (2006.01)
(52) U.S. Cl. .............. 248/429; 248/500; 244/118.1
(58) Field of Classification Search ............ 248/429, 248/500, 503.1, 503; 410/101, 102, 104, 410/105; 244/118.1, 118.5, 118.6
See application file for complete search history.

(56) References Cited

U.S. PATENT DOCUMENTS

| | | | | |
|---|---|---|---|---|
| 4,592,686 A | * | 6/1986 | Andrews | 410/101 |
| 4,708,549 A | * | 11/1987 | Jensen | 410/105 |
| 4,771,969 A | * | 9/1988 | Dowd | 244/118.6 |
| 5,028,016 A | | 7/1991 | Kelvin et al. | |
| 5,058,829 A | * | 10/1991 | Bentley | 244/122 R |
| 5,083,726 A | * | 1/1992 | Schurr | 244/118.6 |
| 5,178,346 A | * | 1/1993 | Beroth | 244/122 R |
| 5,248,176 A | * | 9/1993 | Fredriksson | 294/215 |
| 5,871,318 A | * | 2/1999 | Dixon et al. | 410/105 |
| 7,318,695 B2 | * | 1/2008 | Yu et al. | 410/105 |
| 7,427,049 B2 | * | 9/2008 | Kennedy et al. | 244/118.6 |
| 2003/0085330 A1 | | 5/2003 | Lee | |
| 2008/0231092 A1 | | 9/2008 | Silva | |

FOREIGN PATENT DOCUMENTS

EP 0922632 A2 6/1999

* cited by examiner

*Primary Examiner* — Terrell McKinnon
*Assistant Examiner* — Steven Marsh
(74) *Attorney, Agent, or Firm* — Jerry J. Holden; John D. Titus

(57) ABSTRACT

An equipment support for attaching equipment to an aircraft comprises a gripper foot having a T-shaped slot that engages a track mounted to the aircraft floor. The gripper foot is mounted to a trunnion mount that enables the gripper foot to rotate freely about a vertical axis so that the gripper foot can negotiate curves along a non-linear track. The trunnion mount is mounted to the equipment support frame by means of a horizontal pivot. The horizontal pivot is held against rotation below a predetermined load by a torque-resisting element. If the floor track is warped, for example during a crash, the twisting loads transmitted from the floor track to the gripper foot overcome the torque-resisting element, which allows the trunnion mount and gripper foot to rotate with the floor track thereby allowing the gripper foot to remain attached to the track without imparting excessive loads on the track, gripper foot, or equipment support frame.

21 Claims, 6 Drawing Sheets

-PRIOR ART-

AIRCRAFT EQUIPMENT SUPPORT

BACKGROUND OF THE INVENTION

The present invention relates to adjustable supports for aircraft interior equipment, in particular, adjustable supports for aircraft seating and the like.

According to the General Aviation Crash Worthiness Project of the National Transportation Safety Board ("NTSB"), incidents of severe injuries and fatalities in survivable crashes of the general aviation fleet could be significantly improved by the use of energy absorbing seats and occupant restraints. According to one study conducted by the NTSB, many of the seats in the general aviation fleet broke or come off the seat tracks during survivable crashes. In one study, 44% of the occupied seats involved in general aviation crashes became detached from the airplane structure, usually because the seat feet or legs broke or separated. In one case the seat came loose, which allowed the occupant, who had survivable injuries, to fall out of the airplane and drown in shallow water. In another case, the seat frame collapsed allowing the rear legs to move closer to the front legs which allowed the rear of the seat to rotate down accelerating the occupant toward the floor.

In addition to failures caused by the seat structure itself, floor warping due to collapsing of the airframe can cause seats to fail. As the aircraft floor warps, extra stresses are placed on the seat feet as the seat resists changing its original shape to accommodate the floor warp. Floor warping can also be caused by excessive side loads imparted to the seat by deceleration other than along the longitudinal axis of the aircraft. For example, with a misalignment of only ten degrees, a 9-g forward acceleration can create a side load of 1.2 g on the seat feet.

Prior art aircraft seating has addressed the need for the seat to remain attached to the floor in spite of floor warping in a number of ways, including through the use of a flexible seat frame such the Piper Aircraft, Inc.'s "S-tube" seat. Another aircraft seat capable of accommodating floor warping includes a thin "fin" machined between the side structure of the seat and the track gripper. The fin flexes to accommodate the warping of the floor while maintaining the track gripper in contact with the seat track. What is needed, however, is an aircraft seat capable of accommodating floor warping during a crash that is also capable of moving along a non-linear seat track as is required in modern aircraft.

SUMMARY OF THE INVENTION

The present invention comprises a support for securing aircraft interior equipment such as a seat to the floor of an aircraft. According to an illustrative embodiment, the equipment support comprises a gripper foot having a T-shaped slot that engages the track mounted to the aircraft floor. The gripper foot is mounted to a trunnion mount that enables the gripper foot to rotate freely about a vertical axis so that the gripper foot can negotiate curves along a non-linear floor track. The trunnion mount is then mounted to the equipment support frame by means of a horizontal pivot. The horizontal pivot, however, is locked against rotation by one or more torque-resisting elements such as shear pins or friction locks that are designed to release at a predetermined load.

In normal operation with the trunnion mount locked in position, the gripper foot remains vertical as it is moved along the floor track. If, however, the floor track is warped, for example during a crash, the twisting loads transmitted from the floor track to the gripper foot overcomes the resistance of the torque-resisting element(s), which allows the trunnion mount and gripper foot to rotate with the floor track thereby allowing the gripper foot to remain attached to the track without imparting excessive loads on the track, gripper foot, or equipment support frame.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
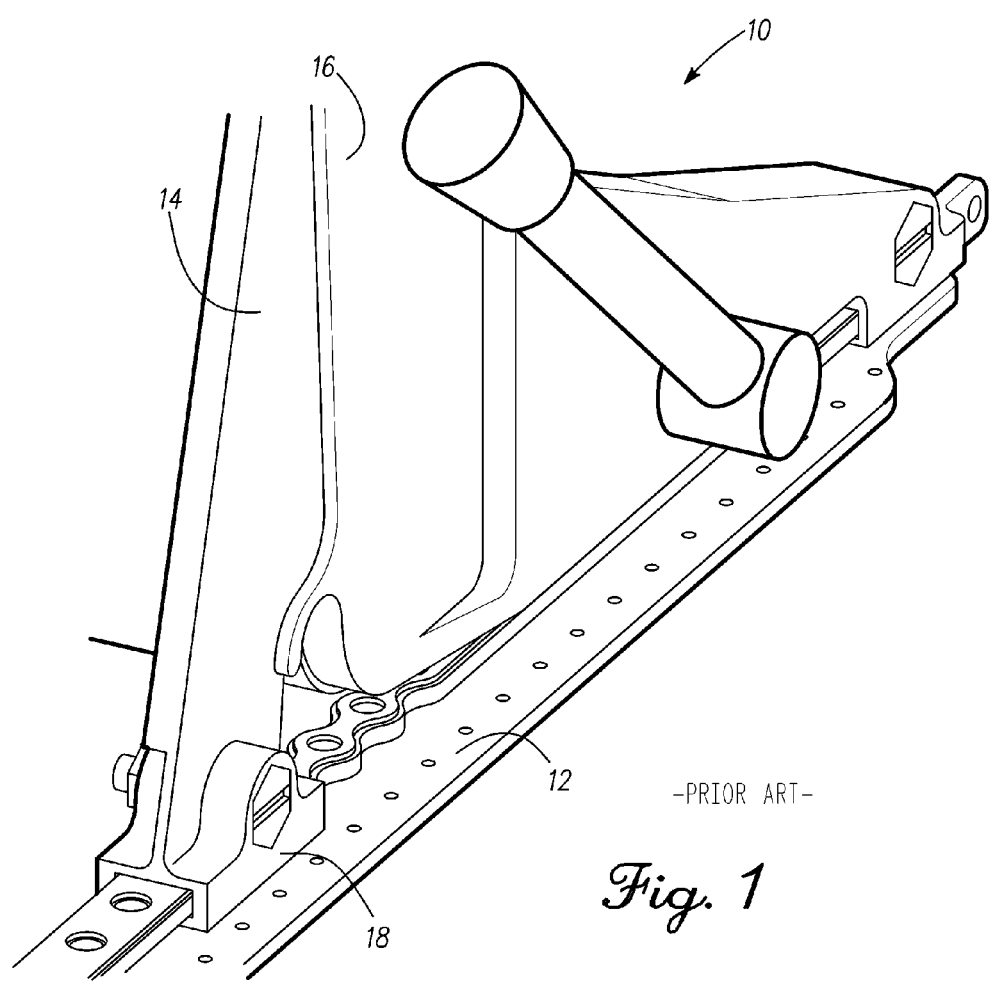
FIG. 1 is a perspective view of a portion of a prior art aircraft seat support.
Figure 2:
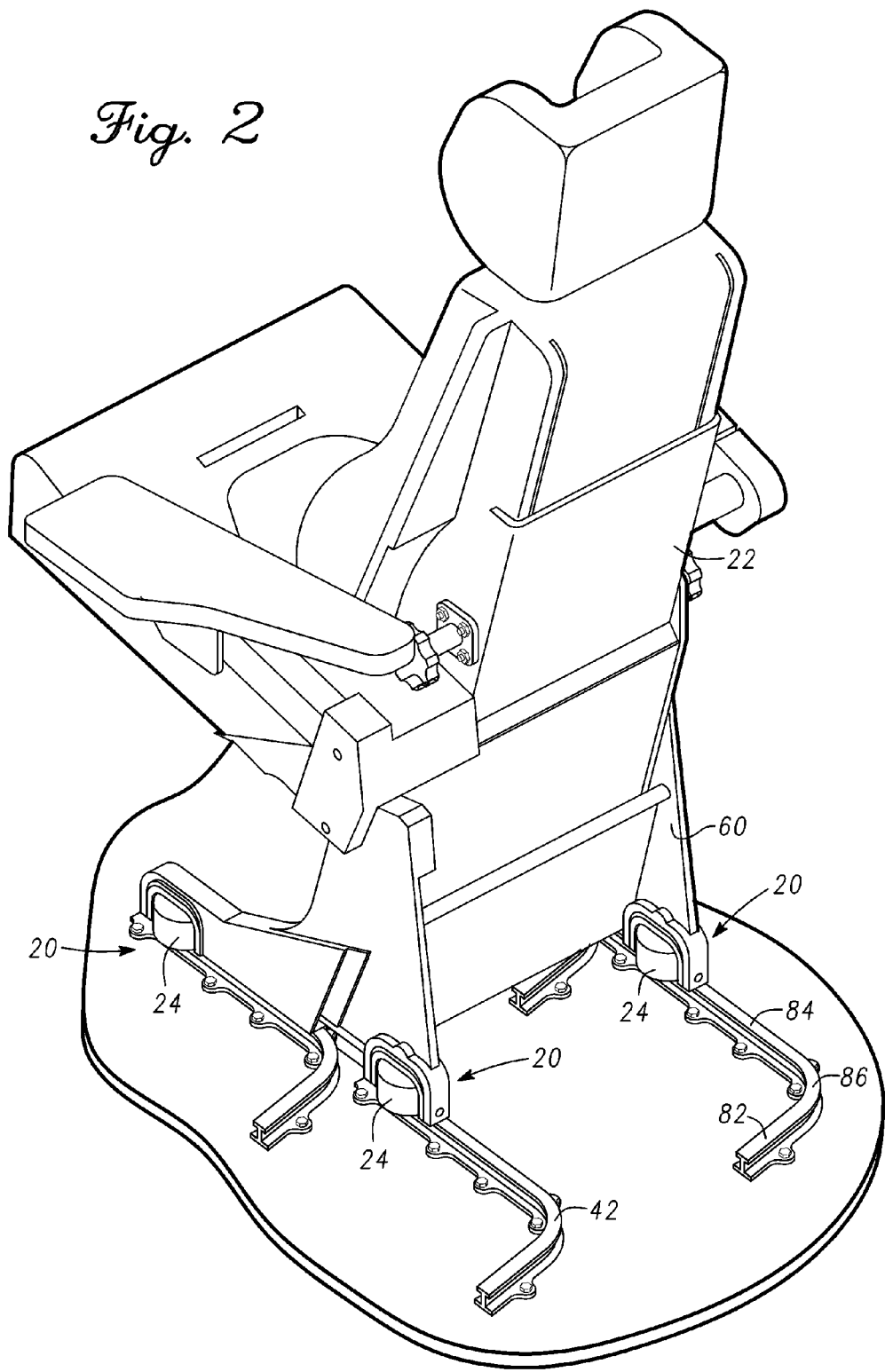
FIG. 2 is a perspective view of an aircraft seat supported by aircraft equipment supports incorporating features of the present invention.
Figure 3:
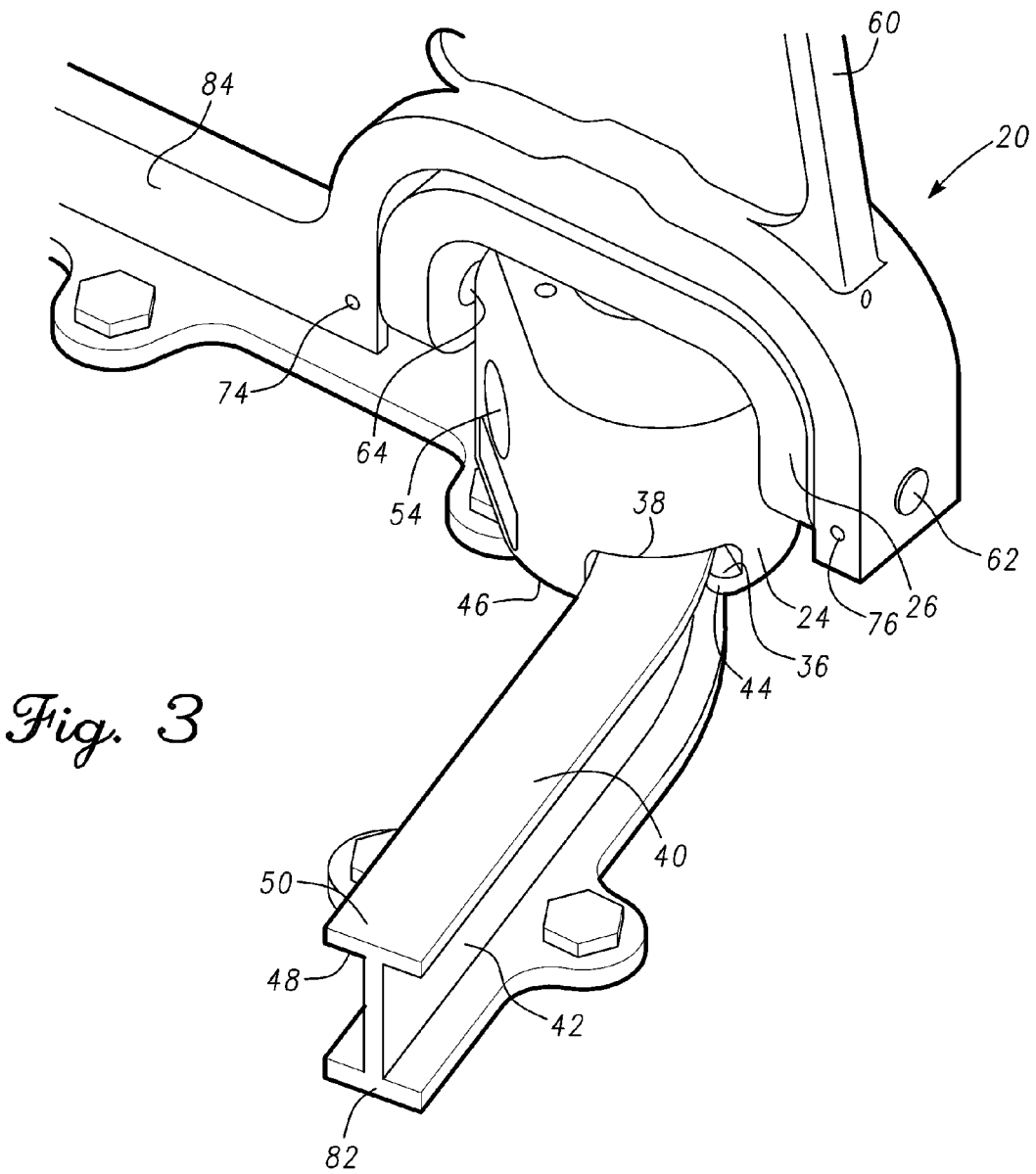
FIG. 3 is a perspective view of an aircraft equipment support incorporating features of the present invention shown in its normal position.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

As noted hereinbefore, survivability of crashes in general aviation is enhanced when aircraft seating remains attached to the aircraft floor despite floor warping due to collapse of the fuselage. As shown in FIG. 1, a prior art aircraft seat frame 10 accommodates warping of the aircraft floor and with it seat track 12 by providing a "fin" 14 between seat frame 16 and gripper foot 18 which allows gripper foot 18 to twist relative to frame 16 without imparting undue stress on frame 16 or gripper foot 18.

With reference to FIGS. 2-5, aircraft equipment support 20, which may be used, for example to support an aircraft seat 22 to a non-linear seat track 42 comprises a gripper foot 24 which is attached to a trunnion mount 26 by means of a vertical pivot 28. Vertical pivot 28 allows gripper foot 24 to rotate freely about a vertical axis 58 relative to trunnion mount 26. In the illustrative embodiment, vertical pivot 28 comprises a bolt 30 and a stop nut 32 which in cooperation with bushing 34 retain gripper foot 24 to trunnion mount 26 while permitting gripper foot 24 to rotate freely about vertical pivot axis 58.

Gripper foot 24 comprises a substantially bell-shaped body having a T-shaped slot 36 formed at the mouth end. T-shaped slot 36 includes a lower surface 38 that is disposed above the upper surface 40 of seat track 42. Claw portions 44 and 46 of the T-shaped slot 36 of gripper foot 24 curve underneath and are disposed in a parallel spaced-apart relationship to lower surface 48 of the horizontal flange portion 50 of seat track 42.

In the illustrative embodiment, gripper foot 24 further includes a wheel 52 mounted to a wheel shaft 54 which is mounted to gripper foot 24 so that the longitudinal axis 56 of wheel shaft 54 lies in a common plane with a vertical pivot axis 58 of the vertical pivot 28. Wheel 52 provides for low rolling friction as gripper foot 24 moves across upper surface 40 of the horizontal flange portion 50 of seat track 42 enabling seat 22 to be quickly and easily moved into position. Wheel 52 may be mounted to wheel shaft 54 by any conventional means including plain bearing, needle bearing, or ball bearing. Optionally, wheel 52 can be omitted in favor of a low sliding friction pad (e.g., PTFE or UHMWPE) in which case lower surface 38 of gripper foot 24 would directly engage upper surface 40 of horizontal flange portion 50 rather than being disposed above upper surface 40.

Figure 4:
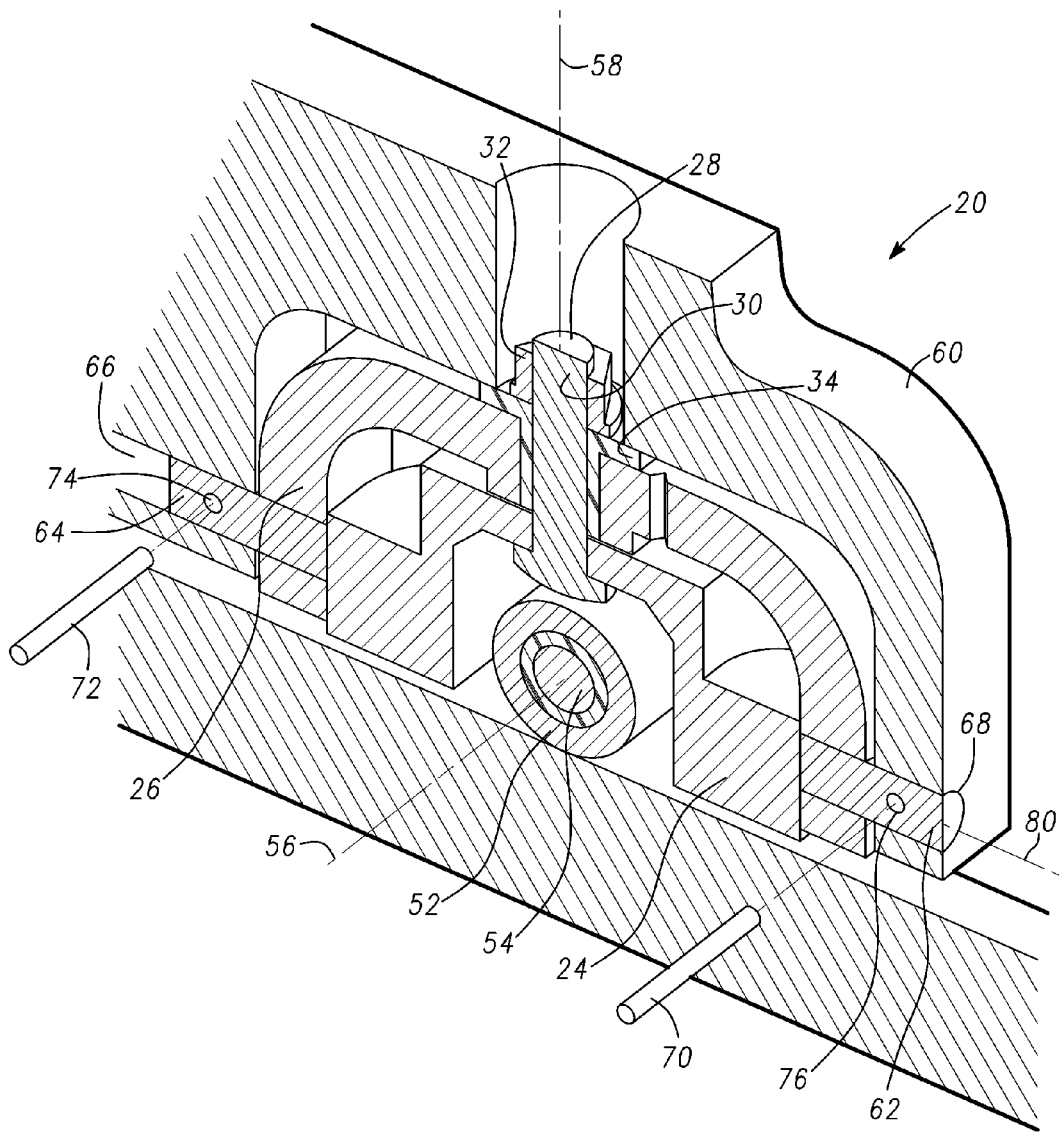
FIG. 4 is a cross-sectional view of the aircraft equipment support of FIG. 3.

With particular reference to FIG. 4, trunnion mount 26 is attached to seat frame 60 by means of pivot shaft 62 and pivot shaft 64 which are rigidly attached against rotation (e.g., by splines, pins, etc. to trunnion mount 26. Pivot shaft 62 and pivot shaft 64 freely rotate in bores 66 and 68 formed in seat frame 60 about horizontal pivot axis 80. Horizontal pivot axis 80 and axis 56 of wheel shaft 54 lie in a common plane, which minimizes the torque on pivot shaft 62 and pivot shaft 64 caused by side loads on wheel 52. Although trunnion mount 26 is free to rotate relative to seat frame 60, trunnion mount 26 is constrained against rotation by means of shear pins 70 and 72 which are inserted in corresponding bores 74, 76 passing through seat frame 60 and pivot shafts 62, 64. Shear pins 70 and 72 are designed to fail at a predetermined torque exerted on pivot shaft 62 and pivot shaft 64 for reasons explained more fully hereinafter.

Figure 5:
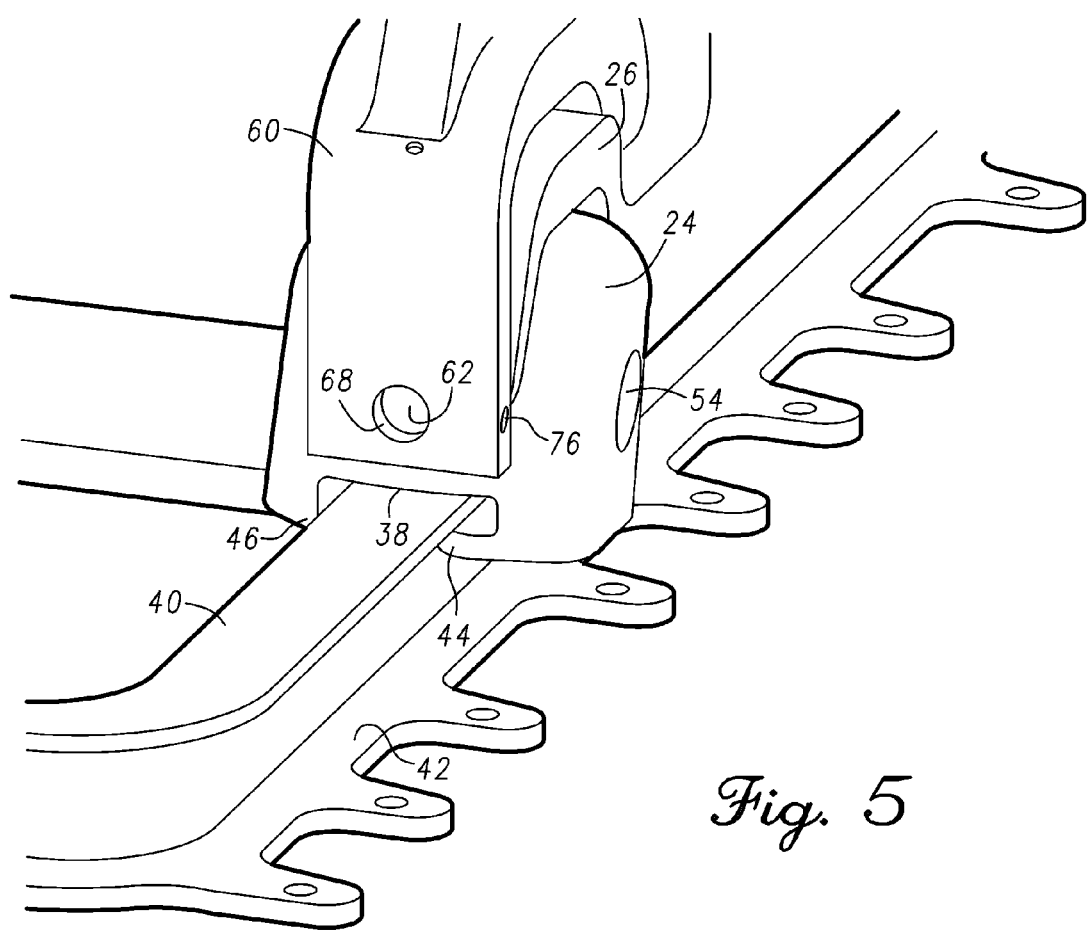
FIG. 5 is a perspective view of the aircraft equipment support of FIG. 3 shown in its floor-warped position.

In normal operation, trunnion mount 26 is held rigidly by shear pins 70 and 72 while gripper foot 24 is free to pivot about vertical axis 58. This enables equipment support 20 to be moved from a first linear section 82 of seat track 42 to a second linear section 84 of seat track 42 through a curved section 86 of seat track 42. With reference to FIG. 5, however, if seat track 42 is twisted, for example as a result of the aircraft floor warping, shear pins, 70 and 72 shear at a predetermined load, which enables trunnion mount 26 to rotate relative to seat frame 60 thereby allowing gripper foot 24 to remain attached to seat track 42 without transmitting undue bending loads to seat frame 60. This enables seat 22 to remain attached to seat track 42 during a crash even if the floor is warped due to collapse of the aircraft fuselage thereby protecting the occupants in a survivable crash.

Figure 6:
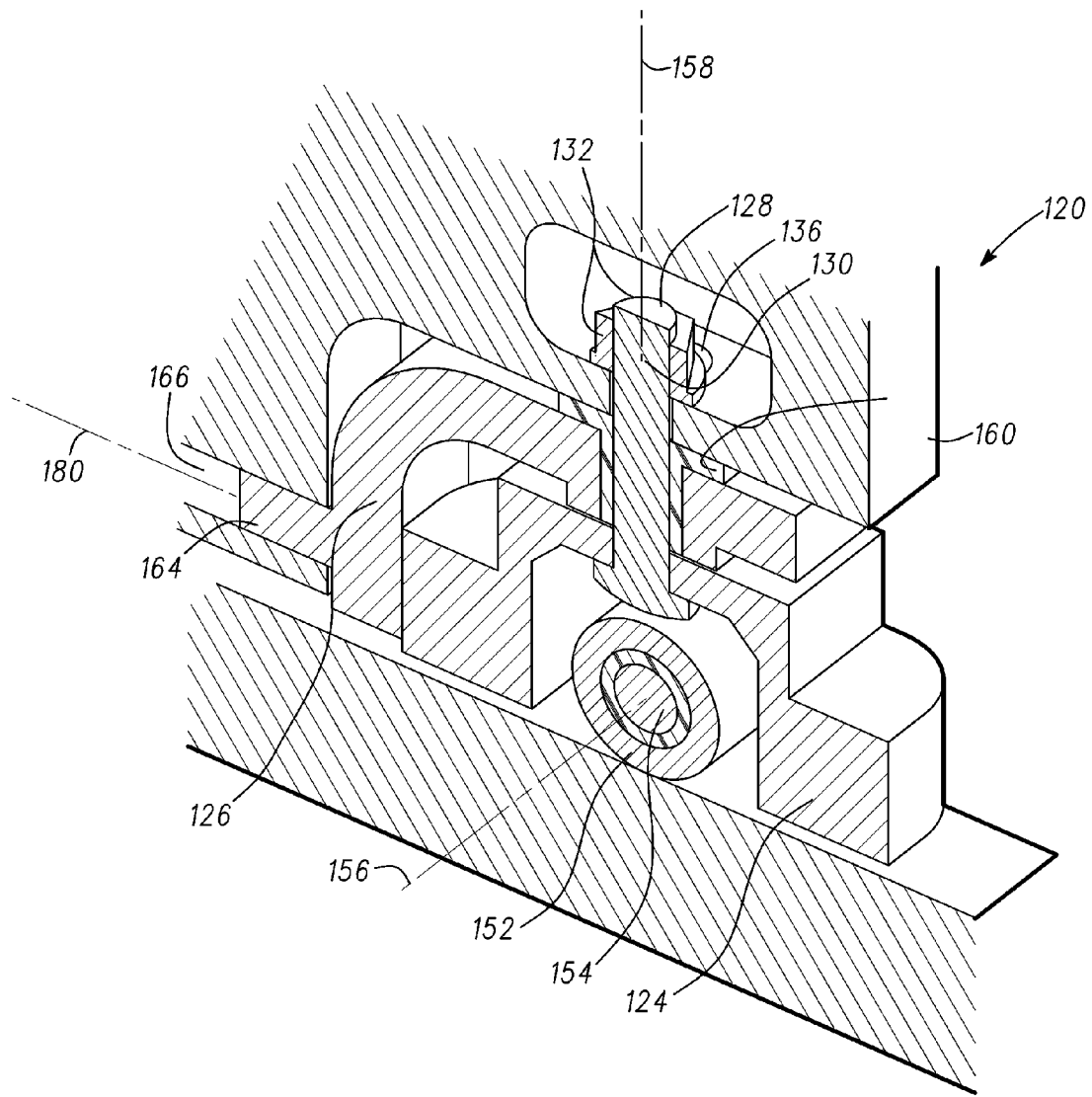
FIG. 6 is a cross-sectional view of an alternative embodiment of an aircraft equipment support incorporating features of the present invention.

With reference to FIG. 6, in an alternative embodiment 120 of an aircraft equipment support incorporating features of the present invention gripper foot 124 supports a wheel 152 mounted to a wheel shaft 154. Gripper foot 124 is mounted to trunnion mount 126 by means of a vertical pivot 128 and bushing 134, which allow gripper foot 124 to freely rotate about vertical axis 158. Vertical pivot 128 may be a conventional bolt or carriage bolt, but for reasons more fully explained hereinafter, vertical pivot 128 comprises a shoulder screw 130 secured with a stop nut 132. Use of a shoulder screw 130 enables gripper foot 124 to freely rotate about vertical pivot 128 without binding while at the same time permitting shoulder screw 130 to be drawn tightly against seat frame 160.

Trunnion mount 126 has a substantially J-shaped cross section rather than the U-shaped cross section of the embodiment of the embodiment of FIGS. 1-5. Consequently, trunnion mount 126 is attached to seat frame 160 by means of a single pivot shaft 164 which is integrally formed as part of trunnion mount 126. Pivot shaft 164 is free to rotate in bore 166 formed in seat frame 160 about horizontal pivot axis 180. Horizontal pivot axis 180 and axis 156 of wheel shaft 154 lie in a common plane, which minimizes the torque on pivot shaft 164 caused by side loads on wheel 152. Although trunnion mount 126 is free to rotate relative to seat frame 160, trunnion mount 126 is constrained against rotation by means of the frictional engagement between shoulder screw 130 and seat frame 160. The magnitude of the frictional engagement in the embodiment of FIG. 6 is adjustable in situ, since it is a function of the coefficient of friction and the torque applied to stop nut 132.

In normal operation, trunnion mount 126 is held rigidly by shoulder screw 130, while gripper foot 124 is free to pivot about vertical axis 158. This enables equipment support 120 to be moved through the curved section 86 of seat track 42. If seat track 42 is twisted, for example as a result of the aircraft floor warping the frictional engagement between shoulder screw 130 and seat frame 160 is overcome. Shoulder screw 130 then slides laterally in the elongated hole 136, formed in seat frame 160. This action enables trunnion mount 126 to rotate relative to seat frame 160 thereby allowing gripper foot 124 to remain attached to seat track 42 without transmitting undue bending loads to seat frame 160. As with the embodiment of FIGS. 1-5, this enables equipment support 120 to remain attached to seat track 42 during a crash even if the floor is warped due to collapse of the aircraft fuselage thereby protecting the occupants in a survivable crash.

Although certain illustrative embodiments and methods have been disclosed herein, it will be apparent from the foregoing disclosure to those skilled in the art that variations and modifications of such embodiments and methods may be made without departing from the invention. For example, in the illustrative embodiment the seat track has a substantially I-shaped cross section (with a T-shaped upper portion), other seat tracks with C-shaped, T-shaped or other cross sections are contemplated within the scope of the invention. Additionally, although in the illustrative embodiment, trunnion mount is prevented from rotating about the horizontal axis by shear pins or friction locks, other means of locking trunnion mount against rotation below a predetermined threshold such ball detents, sprag clutches and/or resilient members are contemplated within the scope of the invention. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. An equipment support for securing aircraft interior equipment to an airframe, the airframe having an equipment mounting rail comprising a substantially vertical web portion and a substantially horizontal flange portion, the flange portion having an upper surface and a lower surface, the equipment support comprising:
   a rigid frame;
   a trunnion mount, said trunnion mount comprising a rigid support pivotably mounted to said rigid frame for pivoting about a substantially horizontal pivot axis relative to said rigid frame; and
   a gripper foot, said gripper foot comprising a rigid member comprising a support portion having a lower surface disposed above the upper surface of the flange portion of the equipment mounting rail, said gripper foot further comprising a claw portion having a surface disposed below the lower surface of the flange portion of the equipment mounting rail such that the flange portion of the mounting rail is constrained for sliding between the claw portion and the support portion of said gripper foot; and an upright pivot, said upright pivot pivotably attaching said gripper foot to said trunnion mount so that the gripper foot, including the claw portion, is able to rotate about a substantially vertical pivot axis relative to said trunnion mount.

2. The equipment support of claim 1, wherein:
said trunnion mount is U-shaped.

3. The equipment support of claim 1, wherein:
said trunnion mount is substantially J-shaped.

4. The equipment support of claim 1, further comprising:
a wheel operatively disposed between said gripper foot and the upper surface of the flange portion of the mounting rail, said wheel comprising a rolling member mounted for rotation about a wheel shaft having a longitudinal axis, said wheel providing a low rolling friction as said flange portion slides between the claw portion and the support portion of said gripper foot.

5. The equipment support of claim 4, further comprising:
a second claw portion, said second claw portion having a surface disposed below the lower surface of the flange portion of the equipment mounting rail opposite said first claw portion such that the flange portion of the mounting rail is constrained for sliding between the first claw portion, the second claw portion and the support portion of said gripper foot.

6. The equipment support of claim 1, further comprising:
a seat mounted to the frame.

7. The equipment support of claim 1, wherein:
said gripper foot is bell shaped.

8. The equipment support of claim 1, further comprising:
means for retaining said gripper foot in a substantially vertical position below a predetermined threshold load.

9. The equipment support of claim 8 wherein:
said means for retaining said gripper foot in a substantially vertical position comprises a shear pin.

10. The equipment support of claim 8 wherein:
said means for retaining said gripper foot in a substantially vertical position comprises frictional engagement between said trunnion mount and said rigid frame.

11. The equipment support of claim 4, wherein,
said trunnion mount is substantially J-shaped; and the horizontal pivot axis of said trunnion mount substantially intersects the longitudinal axis of the wheel shaft.

12. The equipment support of claim 4, wherein:
the vertical pivot axis of said trunnion mount, substantially intersects the longitudinal axis of the wheel shaft.

13. The equipment support of claim 1, wherein:
the equipment mounting rail has a first linear section, a second linear section and a curved section joining the first linear section and the second linear section.

14. An equipment support for securing aircraft interior equipment to an airframe, the airframe having an elongate equipment mounting rail with an upper portion having a substantially T-shaped cross-section, the T-shaped cross-section having a substantially vertical web portion and a substantially horizontal flange portion, the equipment support comprising:
a rigid frame;
a trunnion mount, said trunnion mount comprising a rigid support pivotably mounted to said rigid frame for pivoting said trunnion mount about a substantially horizontal axis relative to said rigid frame; and
a gripper foot pivotably mounted to said trunnion mount about an axis substantially orthogonal to the horizontal axis of said trunnion mount, said gripper foot comprising a rigid member having a substantially T-shaped slot formed therein, the T-shaped slot being sized to permit the T-shaped cross section of the equipment rail to pass therethrough, said gripper foot further including an upright pivot, said upright pivot pivotably attaching said gripper foot to said trunnion mount about a substantially vertical pivot axis relative to said trunnion mount.

15. The equipment support of claim 14, further comprising:
a seat mounted to the frame.

16. The equipment support of claim 14, wherein:
said gripper foot is bell shaped.

17. The equipment support of claim 14, further comprising:
means for retaining said gripper foot in a substantially vertical position below a predetermined threshold load.

18. The equipment support of claim 14, further comprising:
an adjustable friction member operatively attached between said gripper foot and said trunnion mount for retaining said gripper foot in a substantially vertical position below a predetermined threshold load.

19. The equipment support of claim 12, further comprising:
a wheel operatively disposed between said gripper foot and the upper surface of the flange portion of the mounting rail, said wheel comprising a rolling member mounted for rotation about a wheel shaft having a longitudinal axis, said wheel providing a low rolling friction as said flange portion slides through the T-shaped slot of said gripper foot.

20. The equipment support of claim 19, wherein,
the horizontal pivot axis of said trunnion mount substantially intersects the longitudinal axis of the wheel shaft.

21. The equipment support of claim 19, wherein:
the vertical pivot axis of said trunnion mount, substantially intersects the longitudinal axis of the wheel shaft.

* * * * *